United States Patent
Cooper et al.

(10) Patent No.: US 6,572,833 B1
(45) Date of Patent: Jun. 3, 2003

(54) AMMONIUM NITRATE BODIES AND A PROCESS FOR THEIR PRODUCTION

(76) Inventors: John Cooper, 11 Lamford Drive, Ayr, KA7 4DE (GB); Michael Brues, 52 Desbarats, Kirkland, Quebec (CA), H9J 2N9; Noel Hsu, 2945 S. Espana Ct., Aurora, CO (US) 80013; Ronald O. Peddie, 1 Cleverton Close, Warners Bay, New South Wales, 2282 (AU)

(*) Notice: Subject to any disclaimer, the term of this patent is extended or adjusted under 35 U.S.C. 154(b) by 0 days.

(21) Appl. No.: 09/701,771

(22) PCT Filed: Jun. 2, 1999

(86) PCT No.: PCT/GB99/01752
§ 371 (c)(1),
(2), (4) Date: Feb. 6, 2001

(87) PCT Pub. No.: WO99/62845
PCT Pub. Date: Dec. 9, 1999

(30) Foreign Application Priority Data

Jun. 3, 1998 (GB) .............................................. 9811824

(51) Int. Cl.⁷ .................................................. C01C 1/18
(52) U.S. Cl. ........................ 423/266; 23/300; 23/302 A; 149/46; 423/396
(58) Field of Search ................................ 423/396, 265, 423/266; 23/300, 302 A; 149/46

(56) References Cited

U.S. PATENT DOCUMENTS

| | | | |
|---|---|---|---|
| 5,354,520 A | 10/1994 | Oliver et al. ................. 264/3.4 |
| 5,395,559 A | 3/1995 | Kaldas et al. ................. 264/3.4 |
| 5,456,775 A | 10/1995 | Schapira et al. ......... 149/109.6 |
| 5,597,977 A | 1/1997 | Chattopadhyay ............... 149/6 |
| 6,022,386 A | * 2/2000 | Vogel et al. ................. 423/396 |

FOREIGN PATENT DOCUMENTS

| | | | |
|---|---|---|---|
| EP | 0 320 153 | 6/1989 | ............. B01J/2/18 |
| WO | WO96/26158 | 8/1996 | ............. C01C/1/18 |

OTHER PUBLICATIONS

Polyakov et al., (Nov. 1981), "Porous granulated ammonium nitrate" Abstract only (XP–002113144).
Zacek et al., (Jun. 1972), "Porous ammonium nitrate" Abstract only (XP–002113143).

* cited by examiner

*Primary Examiner*—Wayne A. Langel
(74) *Attorney, Agent, or Firm*—Greenlee, Winner and Sullivan, P.C.

(57) ABSTRACT

A process for the production of ammonium nitrate bodies in particulate form wherein an ammonium nitrate/water liquid mixture containing at least 92% and preferably at most 97.5% by weight ammonium nitrate, optionally with a proportion of the ammonium nitrate substituted by alkali- and/or alkaline earth metal nitrate, and a small amount of poly-styrene sulphonate crystal-habit modifier is sprayed as droplets into an atmosphere in which cooling effects crystallization of the ammonium nitrate and which the crystallized particles are dried to remove moisture, wherein the liquid mixture also contains ammonium sulphate, the concentration of poly-styrene sulphonate in the liquid mixture being at least 0.01%, preferably in the range 0.02 to 0.06%, by weight, and the concentration of ammonium sulphate in the liquid mixture being greater than that of the poly-styrene suphonate and at least 0.04%, preferably in the range 0.06 to 0.15%, by weight. Ammonium nitrate bodies, preferably prills, produced by the process may contain less than 0.1% by weight water and be able to absorb not less than 6% of their weight of fuel oil while remaining a pourable particulate material.

21 Claims, No Drawings

AMMONIUM NITRATE BODIES AND A PROCESS FOR THEIR PRODUCTION

FIELD OF THE INVENTION

This invention relates to ammonium nitrate bodies produced by spraying a liquid mixture of ammonium nitrate and water that is highly concentrated in ammonium nitrate (herein "AN") in to an atmosphere where the AN rapidly crystallises and water is removed by evaporation. The bodies may be prills (i.e. dense round particles resulting from crystallisation of free-falling droplets of mixture) or agglomerates (i.e. less dense associations of the component AN crystallites, irregular in shape and dimensions) or granules (i.e. generally round particles grown by spraying the mixture on to tumbling seed material such as small AN prill so that layers of AN crystals become encrusted on the seed material).

The invention is particularly concerned with ammonium nitrate bodies for use in explosives products, but is not restricted to such bodies. In particular, the invention may also extend to such bodies for use in fertiliser products.

DESCRIPTION OF THE PRIOR ART

Descriptions of technologies for the production of AN prills and pan-granulated AN bodies are available in the patent and other literature. Reference may usefully be had to EP-A-0320153 (acoustic frequency vibratory prilling to produce a substantially mono-sized prill), U.S. Pat. No. 5,354,520 (intensive prilling process) and U.S. Pat. No. 5,395,559 (pan-granulation to fatten mono-sized small prills). The preferred size for AN prills used in explosives products is about 2–3 mm; the preferred size of granulated products is about 3–4 mm and for these a 1 mm seed prill would be suitable.

AN prill intended for use as oxidiser in explosives products is required to have a sufficient porosity to allow absorption of from 6 to 12% by weight of fuel oil and yet be a particulate free-flowing product which can be poured or augered into bore-holes. This product is so-called ANFO. Such a prill is also a very satisfactory material for blending with emulsion explosive. To achieve such porosity, the AN/water mixture should contain up to, at most, around 97.5% by weight of AN, the preferred range being 92–97.5%, more preferably 94–96% by weight AN. The water content of the AN/water mixture also influences the density and friability of the AN prill. Thus, for instance, a fertiliser grade AN prill which is produced from an AN/water mixture containing at least 98% by weight AN is hard, dense and of low porosity. Other characteristics of an explosives grade AN prill that influence friability and stability towards atmospheric changes (e.g. temperature cycling and humidity) are the micro-crystalline structure and the residual moisture content of the prill. These characteristics are important also in other forms of AN bodies used as solid oxidiser in explosives products, e.g. pan-granulated AN particles, although they would not possess the hardness or low friability desired in an explosive grade AN prill. It is known to incorporate crystal-habit modifiers in AN/water mixtures used as feed in the described processes to encourage or cause the AN to crystallise as small crystals of preferred conformation. As a general rule, smaller crystals of lower aspect ratio are a feature of stronger, less friable AN bodies, especially prills. U.S. Pat. No. 5,597,977 describes the use of poly-styrene sulphonate as an ingredient in AN/water mixtures used to produce AN bodies.

Aside from residual water, minor impurities and minor amounts of deliberately added processing aids and product improvers, the AN bodies intended for use as explosives' oxidant will preferably consist of AN. It is, however, known to substitute some of the AN by alkali- and/or alkaline metal nitrates in explosives' oxidisers, and references herein to AN should be construed as AN optionally with a proportion of the ammonium nitrate substituted by one or more such other nitrate oxidant. Thus, references to AN proportions in the feed mixtures may for practical purposes be read as proportions of total nitrate oxidant.

SUMMARY OF THE INVENTION

According to the present invention, there is provided a process for the production of ammonium nitrate bodies in particulate form wherein an ammonium nitrate/water liquid mixture containing at least 92% by weight ammonium nitrate, optionally with a proportion of the ammonium nitrate substituted by alkali- and/or alkaline earth metal nitrate, and a small amount of poly-styrene sulphonate crystal-habit modifier is sprayed as droplets in to an atmosphere in which cooling effects crystallisation of the ammonium nitrate and in which the crystallised particles are dried to remove moisture characterised in that the liquid mixture also contains ammonium sulphate, the concentration of poly-styrene sulphonate in the liquid mixture is at least 0.01% by weight, and the concentration of ammonium sulphate in the liquid mixture is greater than that of the poly-styrene sulphonate and is at least 0.04% by weight.

The present invention further provides a process for producing AN bodies by prilling, pan-granulation or other means of production of AN particles composed of aggregates of AN crystals in which an AN/water mixture as immediately hereinbefore described is sprayed with cooling to effect crystallisation of the AN followed by drying in a stream of gas, especially air, to remove substantially all free moisture, preferably to a residual water content of at most 0.1% water by weight in the dried product. The process type is preferably prilling under conditions of acoustic frequency vibratory prilling such that substantially mono-sized prills are produced, with drying effected in one or a train of two or more rotary driers under co- or counter current drying gas, e.g. air, flow, and the process is preferably in accordance with the immediately preceding paragraphs.

The present invention also provides AN bodies, especially AN prills, produced by a process as described in either of the two immediately preceding paragraphs.

The invention also extends to the use of a synergistic combination of poly-styrene sulphonate and ammonium sulphate as crystal-habit modifier in the production of ammonium nitrate prill, especially explosive-grade ammonium nitrate prill.

The AN/water mixture preferably contains at most about 97.5%, more preferably 94–97%, even more preferably 95–97%, by weight of AN. However, the AN/water mixture may contain more AN if the AN bodies are to be used in fertiliser products.

Preferably, the concentration of poly-styrene sulphonate is at least 0.02% by weight of the mixture.

The mixture further includes a quantity of ammonium sulphate which is greater than the quantity of poly-styrene sulphonate present, preferably at a concentration in the mixture of, say, 0.06 to 0.15% by weight, more preferably 0.08 to 0.13% by weight.

The poly-styrene sulphonate may be considered to be present as its ammonium salt, given the preponderance of ammonium ions present in the mixture and the normal practice of pH adjustment to a value of around 5.5 by ammonia addition. Poly-styrene sulphonate exists as a range of molecules, not merely because as a polymer there will be a range of chain lengths determined by the polymerisation process and any fractionation, but also because the degree of sulphonation of polymer chains can vary widely. Thus, at one end of the spectrum of possible molecules is poly (vinyl benzene sulphonate) and descending from that best characterised species are a range of sulphonated poly-styrenes. These should preferably be sulphonated to a level of at least 50% relative to poly (vinyl benzene sulphonate), more preferably at least 75%, and most desirably at least 90%. We have produced sulphonated poly-styrenes with more than 90% degree of sulphonation from a range of poly-styrenes with number average molecular weights from 40,000 to 200,000; all were effective additives. Higher molecular weight materials are more viscous and this can make production and handling more difficult. Low molecular weight material has been produced by styrene polymerisation followed immediately by sulphonation without any intermediate separation or purification stages. These materials had molecular weights centred around 10,000 to 20,000 and again were found to be effective. Indeed, following sulphonation, reaction product may be neutralised with ammonia and the result then is a mixture of the sulphonated polymer and ammonium sulphate which may be used in the process of the invention to produce the ammonium nitrate bodies. Typically, the ratio of polymer to ammonium sulphate by weight may be in the range of from about 1:5 to about 1:10, and this range is also very suitable for mixtures made by mixing separately obtained components.

The ability to use crude mixtures of sulphonated polystyrene and ammonium sulphate (from liquor neutralisation with ammonia) is significant in economic terms because poly-styrene sulphonates are not readily available items of commerce and to the extent they may be available they will be expected to be specific materials made with quite different end uses in mind.

The observed effect of using poly-styrene sulphonate alone in minor amounts as a crystal-habit modifier (say, at a concentration by weight in the AN/water mixture fed to the spray head of 0.06%) is that it permits production of AN bodies having a lower standing water content than is achievable under similar regimes of thermal/humidity gradient using ammonium sulphate or other known crystal-habit modifiers alone. Thus, whereas a residual water content of, at best, 0.1% by weight would typically be observed for product prill made using other crystal-habit modifiers, the use of poly-styrene sulphonate enables AN prill to be recovered with a water content as low as 0.05%, even 0.03% by weight. We believe the reason for this effect is that the polymeric sulphonate both facilitates free water transport to exposed AN particle surfaces so that moisture removal is faster in the drying stage(s) and acts to "spring" that proportion of the contained water which is more tenaciously held by the ammonium nitrate and so free it for transport and evaporation. Surprisingly, when we trialled crude batches of laboratory synthesised sulphonated polystyrene still in admixture with substantial amounts of ammonium sulphate (resulting from ammonia neutralisation of the spent acid) we observed, firstly, no interference with the performance of the sulphonate even though ammonium sulphate is a crystal-habit modifier. Experience teaches the opposite. We then investigated the effect of reducing the proportion of crude mixture used in AN prilling with 94–96% AN liquor. We were astonished to discover that concentrations of sulphonate down to 0.02% by weight of the liquor were acceptable in pilot operations (at 60 kg/hr AN liquor) and even 0.01% by weight was functional at higher commercial scale prilling feed rates (above 10 te/hr). Used alone the sulphonate would not have been effective at such low levels. Nor would the use of ammonium sulphate alone have given the observed results. Clearly there was synergy. The same result was obtained using made-up mixtures of sulphonate and sulphate in similar ratios viz: from 1:5 to 1:10 sulphonate to sulphate by weight. Thus, we have discovered that the advantages which flow from the use of poly-styrene sulphonate alone at an effective level in AN liquor feed in the described processes for the production of AN bodies in terms of moisture removal rate, final water content (when desired), particle integrity and oil absorption can be obtained by using a synergistic combination of poly-styrene sulphonate and ammonium sulphate such that the concentration of sulphonate in the AN feed liquor is from 0.01 to, say, 0.06% by weight and the concentration of ammonium sulphate is from 0.04 to, say, 0.15%. The optional upper values in these stated concentration ranges merely reflect economic preference. At levels of sulphonate of more than 0.06% the advantage of synergy may not be enjoyed, but the advantage of being able to use crude neutralised sulphonate batches containing substantial amounts of ammonium sulphate is still real. Likewise, where the synergistic effect is to be exploited, the use of levels of ammonium sulphate above 0.15% by weight in the AN liquor, though technically acceptable, is wasteful. It is our experience that optimised poly-styrene sulphonation processes do not give rise to relative levels of spent acid (sulphuric acid) such that after ammonia neutralisation there is a gross excess of ammonium sulphate in the product mixture. This is the case whether pre-selected poly-styrene is sulphonated or styrene is first polymerised and then sulphonated in a continuous process without isolation of the poly-styrene.

Reference has been made to the level of residual water in produced AN bodies. This is especially important in our experience when the AN bodies are prills. Ammonium nitrate crystals are thermodynamically stable in different crystal structures within different temperature bands. The transition from so-called Phase IV to Phase III occurs at around 32 degrees Celsius. The presence of moisture appears to encourage that transition so that for the usual AN prill familiar to explosives producers a sequence of hot day/cold night storage frequently leads to prill fracture, increased friability and consequent creation of fines (powdered AN). Product handling, storage, transport and explosives performance are all adversely affected. At low residual water levels in the prill, i.e. below 0.1% by weight there appears to be a significant kinetic impediment to the problematic transition. Initial prill hardness achievable by the use of poly-styrene sulphonate as crystal-habit modifier would not seem alone to be a sufficient reason for stability under repeated thermal cycling to the extent observed.

An incidental and commercially important advantage of lower poly-styrene sulphonate usage in the production of AN bodies is that when the bodies are used to make AN liquor for the production of emulsion explosives there is less chance of emulsion stability being adversely affected by interference of the polymeric sulphonate (a surfactant) with the emulsifier.

DETAILED DESCRIPTION OF PREFERRED AND OPTIONAL EMBODIMENTS

Methods of Synthesis of Poly-styrene Sulphonate

Poly-styrene of desired molecular weight is dispersed as a fine powder in 98% strength sulphuric acid containing silver sulphate catalyst at a temperature in the range 98 to 120 degrees Celsius. The powdered poly-styrene is added with intensive stirring to ensure dissolution. Reaction proceeds in the course of this addition and then subsequently for a sufficient period to achieve the desired or maximum degree of sulphonation. Reactor product is neutralised with ammonia.

Alternatively, styrene is first polymerised by low temperature (15 to 20 degrees Celsius) cationic polymerisation in a mixture of 96% strength sulphuric acid (90 parts by weight) and phosphoric acid fortified with phosphorus pentoxide (10 parts by weight). A small amount of surfactant (dipropylene glycol diphosphoric acid) is included. After polymerisation has proceeded sufficiently, the temperature is raised to effect sulphonation as described above. The reactor product is neutralised with ammonia.

The following examples of processes in accordance with the invention are given for purposes of illustration only and should not be considered as limiting the scope of the invention.

EXAMPLE 1

Three equal weight samples of ammonium nitrate/water mixtures were prepared containing 90% by weight AN. To one sample (Sample 1) a quantity of poly (vinyl benzene sodium sulphonate) was added. Its concentration in the liquor was 0.06% by weight. To another sample (Sample 2) a mixture of 1 part by weight of the same sulphonate and 4 parts by weight of ammonium sulphate was added. The concentration of the sulphonate in the liquor was 0.02 % by weight. The third sample (Sample 3) was used as such, without any additive.

The samples were placed at a temperature of 130 decrees Celsius in identical weighed Petri dishes and allowed to cool in an ambient temperature of 21 degrees Celsius. Periodically the dishes were weighed to measure water loss. Table 1 below shows percentage water loss with elapsed time.

TABLE 1

| Time elapse | % loss Sample 1 | % loss Sample 2 | % loss Sample 3 |
|---|---|---|---|
| 1 hour 25 minutes | 3 | 10 | 1.5 |
| 3 hours 25 minutes | 11 | 20 | 1.5 |
| 4 hours 25 minutes | 21 | 31 | 1.5 |
| 5 hours 25 minutes | 32 | 32 | 1.5 |
| 7 hours | 50 | 34 | 1.5 |
| 24 hours | 68 | 60 | 20 |
| 28 hours | 69 | 61 | 24 |
| 48 hours | 73 | 70 | 40 |

Qualitatively, this example shows that drying rate is enhanced by the additives and that, if ammonium sulphate is present, the concentration of the poly-styrene sulphonate may be reduced substantially without loss of drying rate.

EXAMPLE 2

A pilot scale prilling plant was used to produce AN prill samples. The plant was a reduced scale version of a commercial prilling plant. The prilling column interior measured 0.6 m×9 m through which ambient air was passed. At the base of the column the solidified prills were directed to first and second rotary drum driers for moisture removal by co- or counter current air flows (0.7 m/s).The temperature in the first drier was in the range 50 to 70 degrees Celsius and the temperature in the second was 50 degrees Celsius. The drums rotated at 8 rpm and were provided with several sample take-off points along their lengths so that the rate and extent of moisture removal could be monitored. The prilling head was vibrated laterally at a selected acoustic frequency and the prills produced were substantially mono-sized at about 1.7 mm diameter. The feed AN liquor was either 94% or 96% AN strength. Poly-styrene sulphonate and/or ammonium sulphate were included in the AN liquor.

The AN liquor feed rate was 60 kg/hr and drying times were ordinarily between 30 and 60 minutes.

Table 2 presents results from a sequence of runs. The "% weight additive in feed" gives the proportion of poly-styrene sulphonate and/or ammonium sulphate in the feed, with the proportion of ammonium sulphate being determined by subtracting the "% weigh poly-SS".

TABLE 2

| RUN Process | 1 | 2 | 3 | 4 | 5 |
|---|---|---|---|---|---|
| % AN in Feed | 96 | 96 | 96 | 96 | 96 |
| Drier temps. | 50/50 | 70/50 | 50/50 | 50/50 | 50/50 |
| Air flow | Co- | Co- | Co- | Co- | Co- |
| % weight additive in feed | 0.06 | 0.06 | 0.02 | 0.15 | 0.07 |
| % weight poly-SS | 0.06 | 0.06 | 0.02 | 0.02 | 0.01 |
| Product | 1 | 2 | 3 | 4 | 5 |
| Bulk density g/cc | 0.68 | 0.68 | — | 0.64 | — |
| % weight moisture | 0.07 | 0.06 | 0.5 | 0.03 | 0.5 |
| Relative friability | 59 | 7.8 | — | 89 | — |
| Oil abs. by wt % | 10 | 10.1 | — | 9.2 | — |

| RUN Process | 6 | 7 | 8 | 9 | 10 | 11 |
|---|---|---|---|---|---|---|
| % AN | 96 | 96 | 96 | 96 | 94 | 94 |
| Drier temps. | 50/50 | 50/50 | 50/50 | 50/50 | 70/50 | 70/50 |
| Air flow | Co- | Co- | Co- | Co- | Counter | Counter |
| % weight additive in feed | 0.15 | 0.1 | 0.13 | 0.36 | 0 | 0.56 |
| % weight poly-SS | 0.025 | 0.016 | 0 | 0 | 0 | 0.06 |
| Product | 6 | 7 | 8 | 9 | 10 | 11 |
| Bulk density g/cc | 0.6 | 0.65 | — | 0.65 | 0.66 | 0.56 |
| % weight moisture | 0.07 | 0.04 | 1.05 | 0.12 | 0.12 | 0.07 |
| Relative friability | 6.9 | 6.5 | — | 5 | 45 | 16.1 |
| Oil abs. by wt. % | 106 | 7.2 | — | 74 | 8.4 | 15.2 |

In the Table, poly-SS stands for poly-styrene sulphonate; in runs 1–3 it was a poly(vinylbenzene sulphonate) of medium average molecular weight; in runs 4–7 it was the product of sulphonating a medium molecular weight polystyrene by the method described above, followed by ammonia neutralisation; in run 11 it was the material of run 1 mixed with reagent grade ammonium sulphate.

Relative friability figures indicate a measure of fines production after submitting product prills to a particular attrition regime; it is the trend of the displayed values that is significant.

Comments on the Pilot Runs

Runs 1 and 2 show the results obtained using poly-SS alone at a concentration of 0.06% by weight in the AN liquor; run 3 shows that reducing the amount of poly-SS to 0.02% by weight gave poor results the product was wet.

Run 4, in comparison to run 3, shows the benefit of a co-presence of ammonium sulphate at 0.13% by weight in the AN liquor. Run 8 shows that ammonium sulphate alone at that level is ineffective.

Run 5 shows that at this scale of operation a low concentration of both additives was ineffective. However, as runs 6 and 7 show, increasing the ammonium sulphate concentration restored product quality. Run 9 shows the effect of a high concentration of ammonium sulphate alone. Runs 10 and 11 show results when a more aqueous AN feed liquor is used. In run 10 there was no additive; in run 11 the additive was a mixture very rich in ammonium sulphate and the product prill showed good oil absorbancy and good friability for a low density material.

Commercial scale trials at AN liquor feed rates at or above 10 te/hr have confirmed the trends of the Pilot scale runs but significantly have shown that amounts of the additives below the levels of effectiveness shown in pilot runs are an option, if not the preferred operating regime. Thus, results at commercial scale indicate a lower threshold for poly-styrene sulphonate of 0.01% by weight of the feed AN liquor and a lower threshold for ammonium sulphate of 0.04% by weight, but preferably it is present at a concentration of at least 0.06% by weight and more preferably up to 0.15% or higher. We believe that those skilled in the art of producing AN bodies by the described processes can without undue difficulty or extensive trials establish suitable levels of mixed additives for their operations and their product specifications.

The steps, features, compositions and compounds disclosed herein or referred to or indicated in the specification and/or claims of this application, individually, collectively, and any and all combinations of any two or more of said steps or features.

What is claimed is:

1. A process for the production of ammonium nitrate bodies in particulate form wherein an ammonium nitrate/water liquid mixture containing at least 92% by weight ammonium nitrate, optionally with a proportion of the ammonium nitrate substituted by alkali- and/or alkaline earth metal nitrate, and a small amount of poly-styrene sulphonate crystal-habit modifier is sprayed as droplets in to an atmosphere in which cooling effects crystallisation of the ammonium nitrate and in which the crystallised particles are dried to remove moisture characterised in that the liquid mixture also contains ammonium sulphate, the concentration of poly-styrene sulphonate in the liquid mixture is at least 0.01% by weight, and the concentration of ammonium sulphate in the liquid mixture is greater than that of the poly-styrene sulphonate and is at least 0.04% by weight.

2. A process as claimed in claim 1 wherein the process is a prilling process.

3. A process as claimed in claim 1 wherein the liquid mixture contains at most about 97.5% by weight ammonium nitrate.

4. A process as claimed in claim 1 wherein the concentration of poly-styrene sulphonate is at least 0.02% by weight.

5. A process as claimed in claim 1 wherein the concentration of poly-styrene sulphonate is at most about 0.06% by weight.

6. A process as claimed in claim 1 wherein the concentration of ammonium sulphate is in the range of from about 0.06 to about 0.15% by weight.

7. A process as claimed in claim 1 wherein the ratio of poly-styrene sulphonate to ammonium sulphate is in the range of about 1:5 to about 1:10.

8. A process as claimed in claim 1 wherein the poly-styrene sulphonate is a poly(vinyl benzene sulphonate).

9. A process as claimed in claim 1 wherein the poly-styrene sulphonate is a post-sulphonated poly-styrene in which the degree of sulphonation, relative to poly(vinyl benzene sulphonate) is at least 50%.

10. A process as claimed in claim 9 wherein the poly-styrene sulphonate is made by a sulphonation process in which the sulphonate is formed in a sulphuric acid medium and the residual sulphuric acid is neutralised with ammonia so that the sulphonate is in admixture with ammonium sulphate and this mixture is used in the production of the ammonium nitrate bodies.

11. A process as claimed in claim 10 wherein the poly-styrene is made by polymerisation of styrene and the poly-styrene is then sulphonated without first isolating it.

12. The process of claim 3 wherein the liquid mixture contains at most between about 94% and about 97% by weight ammonium nitrate.

13. The process of claim 3 wherein the liquid mixture contains at most between about 95% and about 97% by weight ammonium nitrate.

14. The process of claim 5 wherein the concentration of poly-styrene sulphonate is at most about 0.05% by weight.

15. The process of claim 5 wherein the concentration of poly-styrene sulphonate is at most about 0.04% by weight.

16. The process of claim 6 wherein the concentration of ammonium sulphate is in the range from about 0.07% to about 0.13% by weight.

17. The process of claim 9 wherein the degree of sulphonation relative to poly(vinyl benzene sulphonate) is at least 75%.

18. The process of claim 9 wherein the degree of sulphonation relative to poly(vinyl benzene sulphonate) is above 90%.

19. Ammonium nitrate bodies, especially prills, produced by a process as claimed in claim 1.

20. Ammonium nitrate bodies as claimed in claim 19 which contain less than 0.1% by weight of water and are able to absorb not less than 6% of their weight of fuel oil while remaining a pourable particulate material.

21. A method for producing ammonium nitrate prill, comprising the step of using a synergistic combination of poly-styrene sulphonate and ammonium sulphate as a crystal-habit modifier.

* * * * *

UNITED STATES PATENT AND TRADEMARK OFFICE
CERTIFICATE OF CORRECTION

PATENT NO. : 6,572,833 B1
DATED : June 3, 2003
INVENTOR(S) : Cooper et al.

It is certified that error appears in the above-identified patent and that said Letters Patent is hereby corrected as shown below:

Column 5,
Line 33, please delete "decrees" and replace with -- degrees --.

Column 6,
Lines 16-53, please delete Table 2 and replace with:

TABLE 2

| RUN Process | 1 | 2 | 3 | 4 | 5 |
|---|---|---|---|---|---|
| %AN in Feed | 96 | 96 | 96 | 96 | 96 |
| Drier temps. | 50/50 | 70/50 | 50/50 | 50/50 | 50/50 |
| Air flow | Co- | Co- | Co- | Co- | Co- |
| % weight additive in feed | 0.06 | 0.06 | 0.02 | 0.15 | 0.07 |
| % weight poly-SS | 0.06 | 0.06 | 0.02 | 0.02 | 0.01 |
| Product | 1 | 2 | 3 | 4 | 5 |
| Bulk density g/cc | 0.68 | 0.68 | -- | 0.64 | -- |
| % weight moisture | 0.07 | 0.06 | 0.5 | 0.03 | 0.5 |
| Relative friability | 5.9 | 7.8 | - | 8.9 | - |
| Oil abs. by wt. % | 10 | 10.1 | - | 9.2 | - |

UNITED STATES PATENT AND TRADEMARK OFFICE
CERTIFICATE OF CORRECTION

PATENT NO. : 6,572,833 B1
DATED : June 3, 2003
INVENTOR(S) : Cooper et al.

Page 2 of 2

It is certified that error appears in the above-identified patent and that said Letters Patent is hereby corrected as shown below:

| RUN<br>Process | 6 | 7 | 8 | 9 | 10 | 11 |
|---|---|---|---|---|---|---|
| % AN | 96 | 96 | 96 | 96 | 94 | 94 |
| Drier temps. | 50/50 | 50/50 | 50/50 | 50/50 | 70/50 | 70/50 |
| Air flow | Co- | Co- | Co- | Co- | Counter | Counter |
| % weight additive in feed | 0.15 | 0.1 | 0.13 | 0.36 | 0 | 0.56 |
| % weight poly-SS | 0.025 | 0.016 | 0 | 0 | 0 | 0.06 |
| Product | 6 | 7 | 8 | 9 | 10 | 11 |
| Bulk density g/cc | 0.6 | 0.65 | - | 0.65 | 0.66 | 0.56 |
| % weight moisture | 0.07 | 0.04 | 1.05 | 0.12 | 0.12 | 0.07 |
| Relative friability | 6.9 | 6.5 | - | 5 | 45 | 16.1 |
| Oil abs. by wt. % | 10.6 | 7.2 | - | 7.4 | 8.4 | 15.2 |

Column 7,
Line 44, please delete "in to" and replace with -- into --.
Line 47, please delete "characterized in that" and replace with -- wherein --.

Column 8,
Line 47, delete "especially prills".
Line 56, please delete "modifier." and replace with -- modifier to the ammonium nitrate. --

Signed and Sealed this

Twenty-first Day of October, 2003

JAMES E. ROGAN
*Director of the United States Patent and Trademark Office*